F. MULLINER.
ELASTIC WHEEL-TIRES.
No. 193,988. Patented Aug. 7, 1877.
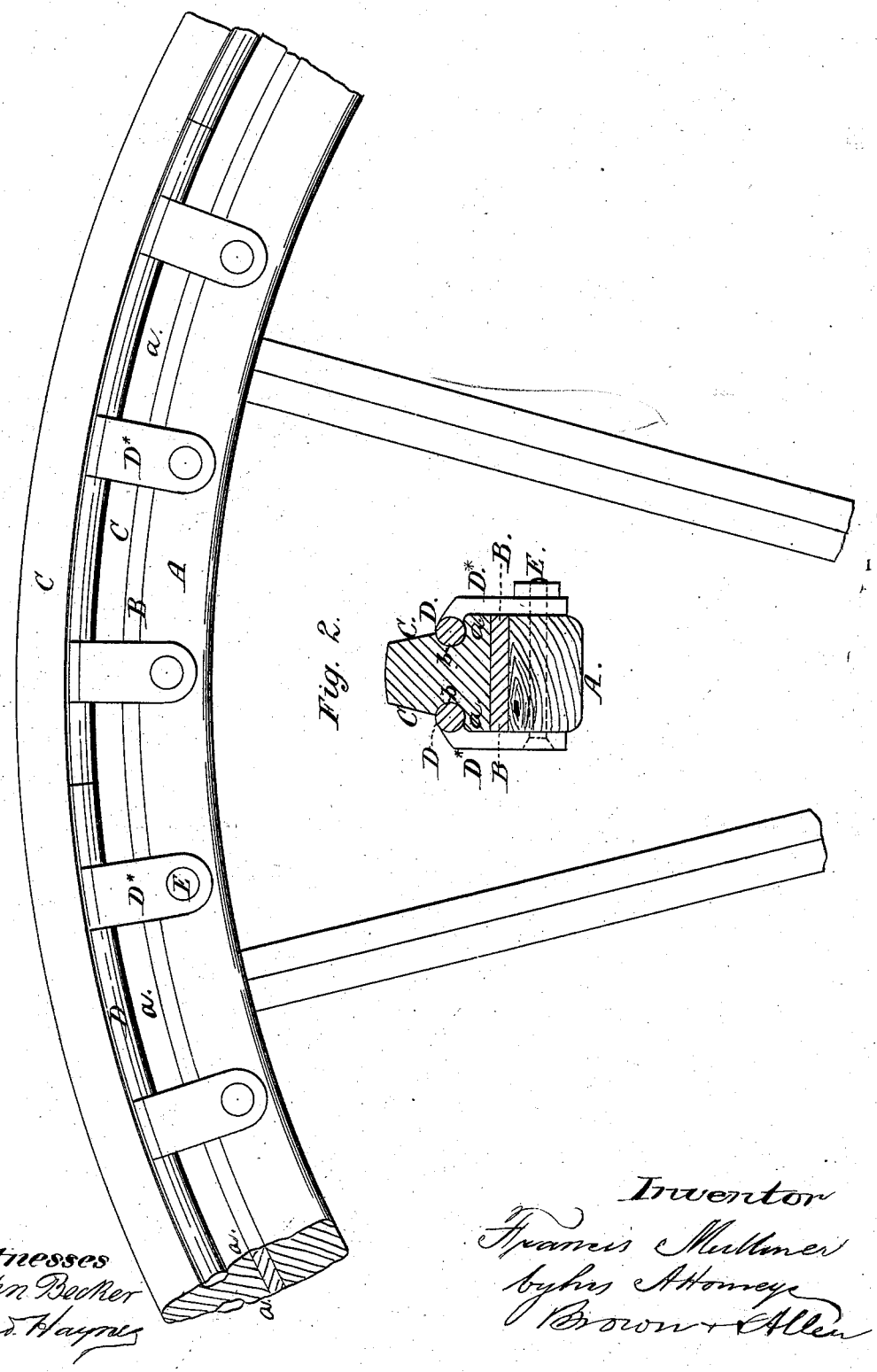
Witnesses
John Becker
Fred Haynes
Inventor
Francis Mulliner
by his Attorneys
Brown & Allen

UNITED STATES PATENT OFFICE.

FRANCIS MULLINER, OF LIVERPOOL, ENGLAND.

IMPROVEMENT IN ELASTIC WHEEL-TIRES.

Specification forming part of Letters Patent No. 193,988, dated August 7, 1877; application filed September 7, 1876.

*To all whom it may concern:*

Be it known that I, FRANCIS MULLINER, of Brook Street, Grosvenor Square, in the county of Middlesex, and Liverpool, in the county of Lancaster, England, have invented certain Improvements in Elastic Wheel-Tires, and in the means for applying the same to wheels, of which the following is a specification:

The object of this invention is to avoid the objection which has hitherto attended the employment of elastic tires, which, after a short time of service, break or become slack and slip out of place; and to this end my invention consists, first, in a molded vulcanized-rubber tire, provided with lateral flanges at its base, and with lateral recesses above and outside of the lateral flanges for the reception of griping-surfaces, whereby the bolts, which have heretofore passed through the flanges for securing the tire in place, are dispensed with, and the tendency of the tire to break or become injured thereby, is entirely prevented; second, in the combination, with the tire and the rim of the wheel, of the flanged elastic tire, griping-surfaces, and fastening devices, as more fully hereinafter specified.

In the accompanying drawing, Figure 1 shows, in side view, a portion of a wheel fitted with an elastic tire of india-rubber according to my invention; and Fig. 2 is a cross-section of the same.

In these views, A is the felly; B, the ordinary metal tire, and C the elastic tire composed of molded vulcanized india-rubber, and its base is constructed at each side with a lateral flange.

The elastic tire C, it will be seen, is made flat on its inner periphery, that it may bed upon the metal tire, and its breadth at that part corresponds with the breadth of the tire B.

The rubber tire C tapers, by preference, toward its outer periphery, as shown in Fig. 2, and in its sides are formed annular recesses *b b*, to receive the lateral griping-pieces D D, said recesses being located outside of or above the flanges *a a* of the rubber tire.

These griping-pieces are made of round wire bent to correspond with the annular recesses in the india-rubber tire, and short radial lugs D* are welded thereto. The lugs of the griping-pieces, on either side of the wheel, are drilled to receive screw-bolts or rivets, and when fitted to the wheel the holes of the lugs are brought into coincidence with the holes drilled transversely through the felly. Bolts E are then passed through the wheel and secured by nuts, as shown at Fig. 2. By this means a tight lateral gripe of the india-rubber tire will be insured, and as the breadth of the tire within the circumference of the griping-pieces is much larger than the space between the annular griping-surfaces, all tendency of the elastic tire to drag away from its bearing-surface will be prevented.

It may be here remarked that the elastic tire may be conveniently made in segments to facilitate replacement of any injured part.

This method of securing the tire is applicable not only to carriage-wheels, but also to the wheels of traction-engines, agricultural implements, velocipedes, hand-barrows, and trucks.

It will be perceived that the peculiarity of my invention consists in providing the elastic tire with recesses for the griping-surfaces above and outside of the flanges on the same, whereby I am enabled to dispense with the bolts usually passed through the flanges for securing the elastic tire to the wheel, and prevent the injurious wearing action consequent upon the use of such bolts, which renders the tire liable to break after a comparatively short time of service.

Having now set forth the nature of my invention and explained the manner of carrying the same into effect, I wish it to be understood that I claim—

1. As a new article of manufacture, a molded vulcanized india-rubber tire, C, provided with lateral flanges *a a* at its base, and lateral recesses *b b* outside or above said lateral flanges for the reception of lateral griping-surfaces, substantially as described.

2. In combination with the ordinary tire B and rim of the wheel, the flanged elastic tire C, griping-surfaces D, and fastening device E, substantially as described.

Dated the 5th day of August, 1876.

FRAS. MULLINER.

Witnesses:
ROBERT A. HAMPSON,
ROBERT HARE.
6 *Water Street, Liverpool.*